United States Patent
Akah et al.

(10) Patent No.: US 11,896,963 B1
(45) Date of Patent: *Feb. 13, 2024

(54) MESOPOROUS ZSM-5 FOR STEAM ENHANCED CATALYTIC CRACKING OF CRUDE OIL

(71) Applicant: Saudi Arabian Oil Company, Dhahran (SA)

(72) Inventors: Aaron Chi Akah, Dhahran (SA); Veera Venkata Ramakrishna Tammana, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,757

(22) Filed: Sep. 26, 2022

(51) Int. Cl.
| | |
|---|---|
| C10G 11/05 | (2006.01) |
| B01J 29/40 | (2006.01) |
| B01J 35/10 | (2006.01) |
| B01J 29/04 | (2006.01) |

(52) U.S. Cl.
CPC ............ B01J 29/40 (2013.01); B01J 29/041 (2013.01); B01J 35/109 (2013.01); B01J 35/1019 (2013.01); B01J 35/1023 (2013.01); B01J 35/1038 (2013.01); B01J 35/1057 (2013.01); B01J 35/1061 (2013.01); C10G 11/05 (2013.01); *B01J 2229/14* (2013.01); *B01J 2229/34* (2013.01); *B01J 2229/38* (2013.01); *B01J 2229/40* (2013.01); *C10G 2300/1033* (2013.01); *C10G 2300/308* (2013.01); *C10G 2300/4006* (2013.01); *C10G 2300/4018* (2013.01); *C10G 2300/4025* (2013.01); *C10G 2300/70* (2013.01); *C10G 2400/20* (2013.01); *C10G 2400/30* (2013.01)

(58) Field of Classification Search
CPC .. C10G 11/05; C10G 11/20; C10G 2300/202; C10G 2300/205; C10G 2300/308; C10G 2300/4025; C10G 2300/4018; C10G 2300/4006; C10G 2300/301; C10G 2300/70; C10G 2300/807; C10G 2400/20; C10G 2400/30; B01J 29/40; B01J 29/041; B01J 35/023; B01J 35/1019; B01J 35/1023; B01J 35/1038; B01J 35/1057; B01J 35/1061; B01J 35/109; B01J 2229/14; B01J 2229/34; B01J 2229/38; B01J 2229/40
USPC ............ 208/113, 118, 119, 120.01, 121, 122
See application file for complete search history.

(56) References Cited

U.S. PATENT DOCUMENTS

| | | |
|---|---|---|
| 7,344,695 B2 | 3/2008 | Xu et al. |
| 10,350,585 B1 | 7/2019 | Al-Herz et al. |
| 2008/0214882 A1 | 9/2008 | Pinnavaia et al. |

FOREIGN PATENT DOCUMENTS

| | | | |
|---|---|---|---|
| CN | 112138712 A | | 12/2020 |
| EP | 1 734 098 | * | 12/2006 |
| WO | 2006038912 A2 | | 4/2006 |
| WO | 2021126298 A1 | | 6/2021 |
| WO | 2022050986 A1 | | 3/2022 |

OTHER PUBLICATIONS

Park et al., "Selective Petroleum Refining Over a Zeolite Catalyst with Small Intracrystal Mesopores", Angew. Chem. Int. Ed. (2009), 48, 7645-7648.*
Siddiqui et al., "Enhancing the Production of Light Olefins by Catalytic Cracking of FCC Naphtha over Mesoporous ZSM-5 Catalyst", Top Catal., (2010), 53, 1387-1393.*
Song et al., "Synthesis and Characterization of Hierarchical ZSM-5 Zeolites with Outstanding Mesoporosity and Excellent Catalytic Properties", Nanoscale Research Letters (2018) 13:364 1-13.*
Rahimi et al., "Catalytic cracking of hydrocarbons over modified ZSM-5 zeolites to produce light olefins: A review", Applied Catalysis A: General 398 (2011), 1-17.*
Al-Jlil et al., "Saudi Arabian clays for lead removal in wastewater", Applied Clay Science, vol. 42, pp. 671-674, 2009.
Ghrib et al., "Synthesis of cocrystallized USY/ZSM-5 zeolites from kaolin and its use in Fluid Catalytic Cracking catalysts", The Royal Society of Chemistry, vol. 00, pp. 1-3, 2013.
Haiyan et al., "In-situ Synthesis and Catalytic Properties of ZSM-5/Rectorite Composites as Propylene Boosting Additive in Fluid Catalytic Cracking Process", Chinese Journal of Chemical Engineering, vol. 20, No. 1, pp. 158-166, 2012.
Hartanto et al., "Synthesis of ZSM-5 Directly from Kaolin without Organic Template: Part-1: Effect of Crystallization Time", Asian Journal of Chemistry, vol. 28, No. 1, pp. 211-215, 2016.
Hartati et al., "Preparation of Hierarchical ZSM-5 From Indonesian Kaolin by Adding Silica", Chemical Technology, vol. 10, No. 1, pp. 87-90, 2016.

(Continued)

*Primary Examiner* — Elizabeth D Wood
(74) *Attorney, Agent, or Firm* — DINSMORE & SHOHL LLP

(57) ABSTRACT

A process for upgrading a hydrocarbon feed includes contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst is hierarchical mesoporous ZSM-5 zeolite. The hierarchical mesoporous ZSM-5 zeolite is made by providing a starting ZSM-5 zeolite, disintegrating the a portion of the starting ZSM-5 in the presence of a surfactant using sodium hydroxide, and then recrystallizing the zeolite constituents in the presence of the surfactant to produce recrystallized ZSM-5 zeolite. The recrystallized ZSM-5 zeolite is then recovered and calcined to produce the hierarchical mesoporous ZSM-5 zeolite.

20 Claims, 6 Drawing Sheets

(56) References Cited

OTHER PUBLICATIONS

Zhang et al., Zeolites in catalysis: sustainable synthesis and its impact on properties and applications, Catalysis Science & Technology, 2022, DOI: 10.1039/D2CY01325H (15 pages).

Notification of Transmittal of the International Search Report and Written Opinion of the International Searching Authority, or the Declaration dated Dec. 22, 2023 pertaining to International application No. PCT/US2023/075013 filed Sep. 25, 2023, 14 pages.

Pour et al., "Effect of ZSM-5 zeolite porosity on catalytic cracking of n-heptane" New Journal of Chemistry, Aug. 15, 2022, pp. 15585-15595, vol. 46, No. 32.

Kadja et al., "Sequential mechanochemical and recrystallization methods for synthesizing hierarchically porous ZSM-5 zeolites" Microporous and Mesoporous Materials, Dec. 1, 2020, pp. 1-8, vol. 308, 110550.

\* cited by examiner

MESOPOROUS ZSM-5 FOR STEAM ENHANCED CATALYTIC CRACKING OF CRUDE OIL

BACKGROUND

Field

The present disclosure relates to processes and catalysts for processing hydrocarbon materials and, in particular, processes and catalyst compositions for catalytically cracking crude oil to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and aromatic compounds, which are basic intermediates for a large portion of the petrochemical industry. Crude oil is conventionally processed by distillation followed by various reforming, solvent treatments, and hydroconversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both. The present disclosure is directed to a cracking catalyst comprising a hierarchical mesoporous ZSM-5 zeolite catalyst and a method of preparing the hierarchical mesoporous ZSM-5 zeolite, which includes disintegration of a portion of a starting ZSM-5 zeolite in the presence of a surfactant and then subsequent recrystallization of the disintegrated constituents in the presence of the surfactant to produce the hierarchical mesoporous ZSM-5 zeolite, which has a hierarchical pore structure having both mesopores and micropores. The present disclosure is further directed to processes of converting hydrocarbon feeds, such as but not limited to crude oil, to produce greater value petrochemical products and intermediates through steam catalytic cracking of the hydrocarbon feeds in the presence of the hierarchical mesoporous ZSM-5 zeolite to produce the greater value petrochemical products and intermediates, such as but not limited to light olefins, light aromatic compounds, or combinations of these. The processes and methods of the present disclosure can more efficiently convert crude oil and other hydrocarbon feeds to greater value petrochemical products and intermediates compared to other conventional refinery processes.

According to at least one aspect of the present disclosure, a process for upgrading a hydrocarbon feed may include contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst may comprise, consist of, or consist essentially of a hierarchical mesoporous ZSM-5 zeolite.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
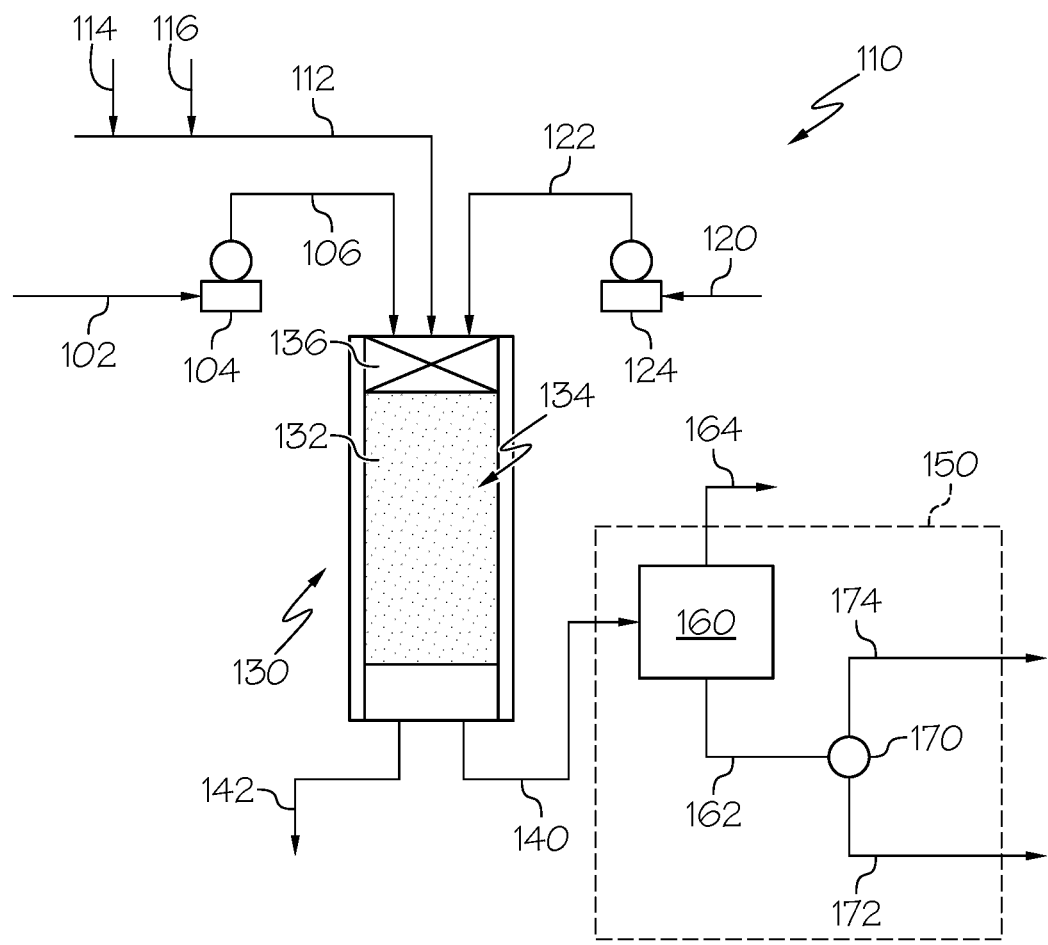
FIG. 1 schematically depicts a generalized flow diagram of a fixed bed reactor system for steam catalytic cracking of crude oil to produce olefins and aromatics, according to one or more embodiments shown and described in the present disclosure.
Figure 5:
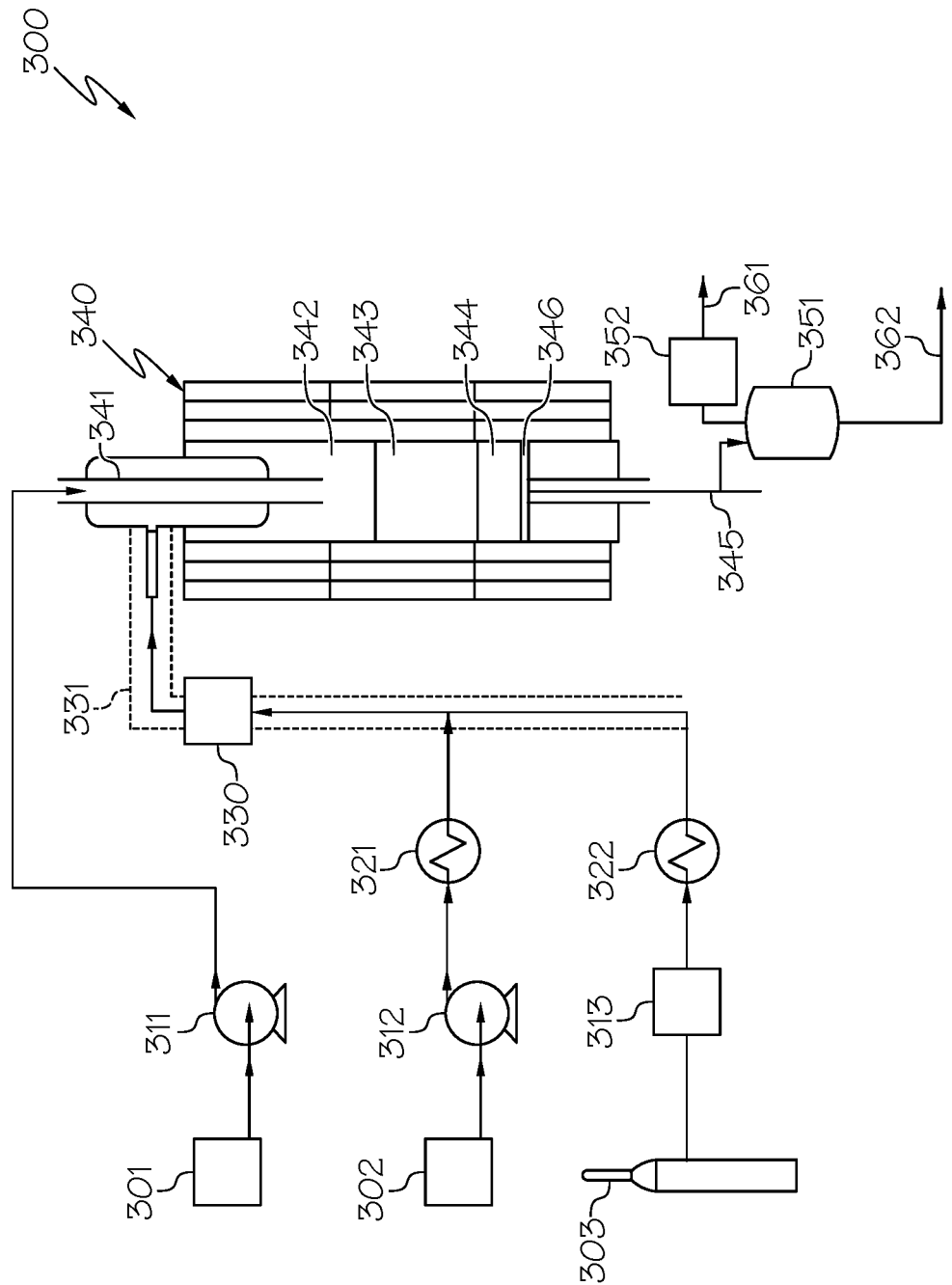
FIG. 5 schematically depicts a generalized flow diagram of a fixed bed reactor system for evaluating the cracking catalysts, according to one or more embodiments shown and described in the present disclosure.

When describing the simplified schematic illustrations of FIGS. 1 and 5 the numerous valves, temperature sensors, electronic controllers, and the like, which may be used and are well known to a person of ordinary skill in the art, may not be included. Further, accompanying components that are often included in systems such as those depicted in FIGS. 1 and 5, such as air supplies, heat exchangers, surge tanks, and the like also may not be included. However, a person of ordinary skill in the art understands that these components are within the scope of the present disclosure.

Additionally, the arrows in the simplified schematic illustrations of FIGS. 1 and 5 refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1 and 5 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DETAILED DESCRIPTION

The present disclosure is directed to cracking catalysts and processes for steam enhanced catalytic cracking of crude oil to produce greater yields of light olefins, light aromatic compounds, or both. A process of the present disclosure for upgrading a hydrocarbon feed may include contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst may consist of a hierarchical mesoporous ZSM-5 zeolite. The hierarchical mesoporous ZSM-5 zeolite may have a hierarchical pore structure comprising micropores and mesopores.

The hierarchical mesoporous ZSM-5 zeolite may be produced by providing a starting ZSM-5 zeolite, disintegrating at least a portion of the starting ZSM-5 zeolite in the presence of a surfactant, then recrystallizing the zeolite constituents in the presence of the surfactant to produce a recrystallized ZSM-5 zeolite, recovering the recrystallized ZSM-5 zeolite, and calcining the recrystallized ZSM-5 zeolite to remove the surfactant and produce the hierarchical mesoporous ZSM-5 zeolite having the hierarchical pore structure. Steam enhanced catalytic cracking of a hydrocarbon feed, such as but not limited to a crude oil, over a cracking catalyst consisting of the hierarchical mesoporous ZSM-5 zeolite of the present disclosure may improve the selectivity and yield of light olefins, light aromatic compounds, or both with less processing steps compared to conventional hydrocarbon refinery systems.

As used in the present disclosure, the term "cracking" refers to a chemical reaction where a molecule having carbon-carbon bonds is broken into more than one molecule by the breaking of one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "catalyst" refers to any substance that increases the rate of a specific chemical reaction, such as but not limited to cracking reactions.

As used in the present disclosure, the term "used catalyst" refers to catalyst that has been contacted with reactants at reaction conditions, but has not been regenerated in a regenerator. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to used catalyst and may have greater catalytic activity compared to used catalyst. The "regenerated catalyst" may have more coke and lesser catalytic activity compared to fresh catalyst that has not been contacted with reactants a cracking reaction zone and then regenerated.

As used throughout the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or a combinations of these.

As used in this disclosure, the term "initial boiling point" or "IBP" of a composition refers to the temperature at which the constituents of the composition with the least boiling point temperatures begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in this disclosure, the term "atmospheric boiling point temperature" refers to the boiling point temperature of a compound at atmospheric pressure.

As used in this disclosure, the term "crude oil" or "whole crude oil" is to be understood to mean a mixture of petroleum liquids, gases, or combinations of liquids and gases, including, in some embodiments, impurities such as but not limited to sulfur-containing compounds, nitrogen-containing compounds, and metal compounds, that have not undergone significant separation or reaction processes. Crude oils are distinguished from fractions of crude oil. In certain embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, the term "directly" refers to the passing of materials, such as an effluent, from a first component of a processing system to a second component of the processing system without passing the materials through any intervening components or unit operations operable to change the composition of the materials. Similarly, the term "directly" also refers to the introducing of materials, such as a feed, to a component of the process system without passing the materials through any preliminary components operable to change the composition of the materials. Intervening or preliminary components or systems operable to change the composition of the materials include reactors and separators, but generally are not intended to include heat exchangers, valves, pumps, sensors, or other ancillary components required for operation of a chemical process.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system. The terms "reaction effluent" and "reactor effluent" particularly refer to a stream that is passed out of a reactor or reaction zone.

The term "residence time" refers to the amount of time that reactants are in contact with a catalyst, at reaction conditions, such as at the reaction temperature.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the terms "separation unit" and "separator" refer to any separation device(s) that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major component of the stream (such as the component comprising the greatest fraction of the stream, excluding diluent gases, such as nitrogen, noble gases, and the like). It should also be understood that components of a stream are disclosed as passing from one system component to another when a stream comprising that component is disclosed as passing from that system component to another. For example, a disclosed "mixed butene stream" passing to a first system component or from a first system component to a second system component should be understood to equivalently disclose "mixed butenes" passing to the first system component or passing from a first system component to a second system component.

Conventional refinery systems include multiple unit operations. Steam enhanced catalytic cracking of crude oil directly can reduce the complexity of the refining process, such as by reducing the number of unit operations needed to process the crude oil. Steam enhanced catalytic cracking typically uses ZSM-5 zeolites, which typically have a microporous pore structure having average pore size of less than 2 nanometers (nm). However, when cracking crude oil directly, crude oil can include a substantial amount of large molecules, such as up to 30 wt. % hydrocarbons having boiling point temperatures greater than or equal to 500° C. These large hydrocarbon molecules are not generally accessible to reactive sites in a conventional microporous ZSM-5 zeolite. Large molecules in crude oil can also plug the pores in the conventional ZSM-5, which can reduce the effectiveness of the conventional ZSM-5 zeolites for steam enhanced catalytic cracking of crude oil and other hydrocarbon feeds.

The present disclosure is directed to steam catalytic cracking of crude oil using a hierarchical mesoporous ZSM-5 zeolite to convert the crude oil to greater value hydrocarbon products, such as but not limited to light olefins, aromatic compounds, or combinations of these. The hierarchical mesoporous ZSM-5 zeolites of the present disclosure have a microporous structure characteristic of ZSM-5 zeolites and also can have mesopores large enough to increase access to reactive sites and to reduce blockage by large molecules from the crude oil. The present disclosure is also directed to the hierarchical mesoporous ZSM-5 zeolite and methods of making the hierarchical mesoporous ZSM-5 zeolite.

Referring now to FIG. 1, a process 100 of the present disclosure for converting a hydrocarbon feed 102 to light olefins, light aromatic compounds, or both, includes contacting the hydrocarbon feed 102 with steam in the presence of a cracking catalyst 132 at reaction conditions sufficient to cause at least a portion of hydrocarbons in the hydrocarbon feed 102 to undergo one or more cracking reactions to produce a steam catalytic cracking effluent 140 comprising light olefins, light aromatic compounds, or both, where the cracking catalyst 132 comprises, consists of, or consists essentially of a hierarchical mesoporous ZSM-5 zeolite.

The hydrocarbon feed 102 may include one or more heavy oils, such as but not limited to crude oil, bitumen, oil sand, shale oil, coal liquids, vacuum residue, tar sands, other heavy oil streams, or combinations of these. It should be understood that, as used in this disclosure, a "heavy oil" refers to a raw hydrocarbon, such as whole crude oil, which has not been previously processed through distillation, or may refer to a hydrocarbon oil, which has undergone some degree of processing prior to being introduced to the process 100 as the hydrocarbon feed 102. The hydrocarbon feed 12 may have a density of greater than or equal to 0.80 grams per milliliter. The hydrocarbon feed 12 may have an end boiling point (EBP) of greater than 565° C. The hydrocarbon feed 12 may have a concentration of nitrogen of less than or equal to 3000 parts per million by weight (ppmw).

In embodiments, the hydrocarbon feed 102 may be a crude oil, such as whole crude oil, or synthetic crude oil. The crude oil may have an American Petroleum Institute (API) gravity of from 22 degrees to 50 degrees, such as from 22 degrees to 40 degrees, from 25 degrees to 50 degrees, or from 25 degrees to 40 degrees. For example, the hydrocarbon feed 102 may include an extra light crude oil, a light crude oil, a heavy crude oil, or combinations of these. In embodiments, the hydrocarbon feed 102 can be a light crude oil, such as but not limited to an Arab light export crude oil. Example properties for an exemplary grade of Arab light crude oil are provided in Table 1.

TABLE 1

Example of Arab Light Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

In embodiments, the hydrocarbon feed 102 may be an Arab Extra Light (AXL) crude oil. An example boiling point distribution for an exemplary grade of an AXL crude oil is provided in Table 2.

TABLE 2

| Property | Units | Value | Test Method |
|---|---|---|---|
| 0.1% Boiling Point (BP) | ° C. | 21 | ASTM D7169 |
| 5% BP | ° C. | 65 | ASTM D7169 |
| 10% BP | ° C. | 96 | ASTM D7169 |
| 15% BP | ° C. | 117 | ASTM D7169 |
| 20% BP | ° C. | 141 | ASTM D7169 |
| 25% BP | ° C. | 159 | ASTM D7169 |
| 30% BP | ° C. | 175 | ASTM D7169 |
| 35% BP | ° C. | 196 | ASTM D7169 |
| 40% BP | ° C. | 216 | ASTM D7169 |
| 45% BP | ° C. | 239 | ASTM D7169 |
| 50% BP | ° C. | 263 | ASTM D7169 |
| 55% BP | ° C. | 285 | ASTM D7169 |
| 60% BP | ° C. | 308 | ASTM D7169 |
| 65% BP | ° C. | 331 | ASTM D7169 |
| 70% BP | ° C. | 357 | ASTM D7169 |
| 75% BP | ° C. | 384 | ASTM D7169 |
| 80% BP | ° C. | 415 | ASTM D7169 |
| 85% BP | ° C. | 447 | ASTM D7169 |
| 90% BP | ° C. | 486 | ASTM D7169 |
| 95% BP | ° C. | 537 | ASTM D7169 |
| End Boiling Point (EBP) | ° C. | 618 | ASTM D7169 |

When the hydrocarbon feed 102 comprises a crude oil, the crude oil may be a whole crude or may be a crude oil that has undergone at some processing, such as desalting, solids separation, scrubbing. For example, the hydrocarbon feed 102 may be a de-salted crude oil that has been subjected to a de-salting process. In embodiments, the hydrocarbon feed 102 may include a crude oil that has not undergone pre-treatment, separation (such as distillation), or other operation or process that changes the hydrocarbon composition of the crude oil prior to introducing the crude oil to the system 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils. In embodiments, the crude oil may have one or more of a 5 wt. % boiling temperature of less than or equal to 150° C.; a 25 wt. % boiling temperature of less than or equal to 225° C. or less than or equal to 200° C.; a 50 wt. % boiling temperature of less than or equal to 500° C., less than or equal 450° C., or less than or equal to 400° C.; a 75 wt. % boiling temperature of less than 600° C., less than or equal to 550° C.; a 95 wt. % boiling temperature of greater than or equal to 550° C. or greater than or equal to 600° C.; or combinations of these. In embodiments, the crude oil may have one or more of a 5 wt. % boiling temperature of from 0° C. to 100° C.; a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as a fluid bed reactors, batch reactors, FCC reactors, or moving bed reactors, may also be used to contact the hydrocarbon feed 102 with the cracking catalyst to conduct the steam catalytic cracking of the process disclosed herein.

The steam catalytic cracking reactor 130 may operate to contact the hydrocarbon feed 102 with steam in the presence of the cracking catalyst of the present disclosure to produce a steam cracking effluent comprising light olefins, aromatic compounds, or combinations of these. As previously discussed, the steam catalytic cracking reactor 130 may be a fixed bed catalytic cracking reactor that may include the cracking catalyst 132 disposed within a steam catalytic cracking zone 134. The steam catalytic cracking reactor 130 may include a porous packing material 136, such as silica carbide packing, upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, or other contaminants that may reduce the effectiveness of the cracking catalyst.

The processes disclosed herein can include introducing the hydrocarbon feed 102 to the steam catalytic cracking system 110, such as introducing the hydrocarbon feed 102 to the steam catalytic cracking reactor 130. Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the distillation feed 110 may be heated from 40° C. to 150° C., from 45° C. to 150° C., from 50° C. to 150° C., from 35° C. to 145° C., from 40° C. to 145° C., from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity of greater than or equal to 0.1 per hour ($h^{-1}$) or greater than or equal to 0.25 $h^{-1}$. The hydrocarbon feed 102 may be injected into the steam catalytic cracking reactor 130 at a gas hourly space velocity of less than or equal to 50 $h^{-1}$, less than or equal to 25 $h^{-1}$, less than or equal to 20 $h^{-1}$, less than or equal to 14 $h^{-1}$, less than or equal to 9 $h^{-1}$, or less than or equal to 5 $h^{-1}$. The hydrocarbon feed 102 may be injected into the steam catalytic cracking reactor 130 at a gas hourly space velocity of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9 $h^{-1}$, from 0.1 $h^{-1}$ to 5 $h^{-1}$, from 0.1 $h^{-1}$ to 4 $h^{-1}$, from 0.25 $h^{-1}$ to 50 $h^{-1}$, from 0.25 $h^{-1}$ to 25 $h^{-1}$, from 0.25 $h^{-1}$ to 20 $h^{-1}$, from 0.25 $h^{-1}$ to 14 $h^{-1}$, from 0.25 $h^{-1}$ to 9 $h^{-1}$, from 0.25 $h^{-1}$ to 5 $h^{-1}$, from 0.25 $h^{-1}$ to 4 $h^{-1}$, from 1 $h^{-1}$ to 50 $h^{-1}$, from 1 $h^{-1}$ to 25 $h^{-1}$, from 1 $h^{-1}$ to 20 $h^{-1}$, from 1 $h^{-1}$ to 14 $h^{-1}$, from 1 $h^{-1}$ to 9 $h^{-1}$, or from 1 $h^{-1}$ to 5 $h^{-1}$ via feed inlet line 106. The hydrocarbon feed 102 may be further pre-heated in the feed inlet line 106 to a temperature of from 100° C. to 250° C. before injecting the hydrocarbon feed 102 into the steam catalytic cracking reactor 130.

Water 120 may be injected to the steam catalytic cracking reactor 130 through water feed line 122 via the water feed pump 124. The water feed line 122 may be pre-heated to heat the water 120 at to a temperature of from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a gas hourly space velocity of greater than or equal to 0.1 $h^{-1}$, greater than or equal to 0.5 $h^{-1}$, greater than or equal to 1 $h^{-1}$, greater than or equal to 5 $h^{-1}$, greater than or equal to 6 $h^{-1}$, greater than or equal to 10 $h^{-1}$, or even greater than or equal to 15 $h^{-1}$. The water 120 may be introduced to the steam catalytic cracking reactor 130 at a gas hourly space velocity of less than or equal to 100 $h^{-1}$, less than or equal to 75 $h^{-1}$, less than or equal to 50 $h^{-1}$, less than or equal to 30 $h^{-1}$, or less than or equal to 20 $h^{-1}$. The water 120 may be introduced to the steam catalytic cracking reactor 130 at a gas hourly space velocity of from 0.1 $h^{-1}$ to 100 $h^{-1}$, from 0.1 $h^{-1}$ to 75 $h^{-1}$, from 0.1 $h^{-1}$ to 50 $h^{-1}$, from 0.1 $h^{-1}$ to 30 $h^{-1}$, from 0.1 $h^{-1}$ to 20 $h^{-1}$, from 1 $h^{-1}$ to 100 $h^{-1}$, from 1 $h^{-1}$ to 75 $h^{-1}$, from 1 $h^{-1}$ to 50 $h^{-1}$, from 1 $h^{-1}$ to 30 $h^{-1}$, or from 1 $h^{-1}$ to 20 $h^{-1}$.

The steam from injection of the water 120 into the steam catalytic cracking reactor 130 may reduce the hydrocarbon partial pressure, which may have the dual effects of increasing yields of light olefins (e.g., ethylene, propylene and butylene) as well as reducing coke formation on the cracking catalyst. Not intending to be limited by any particular theory, it is believed that light olefins like propylene and butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bi-molecular reactions, and may reduce the concentration of reactants and products, which favor selectivity towards light olefins. The steam may also suppress secondary reactions that are responsible for coke formation on catalyst surface, which is good for catalysts to maintain high average activation. These factors may show that a large steam-to-oil weight ratio may be beneficial to the production of light olefins.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst in the steam catalytic cracking reactor 130 under reaction conditions sufficient to cause at least a portion of the hydrocarbons from the hydrocarbon feed 102 to undergo one or more cracking reactions to produce a steam catalytic cracking effluent 140 comprising light olefins, light aromatic compounds, or both. In embodiments, the steam catalytic cracking effluent 140 may comprise light olefins, which may include but are not limited to ethylene, propylene, butenes, or combinations of these. In embodiments, the steam catalytic cracking effluent 140 may comprise light aromatic compounds, which refers to compounds containing an aromatic ring structure and having less than or equal to 10 carbon atoms. The light aromatic compounds in the steam catalytic cracking effluent 140 may include but are not limited to benzene, toluene, ethylbenzene, xylenes, or other light aromatic compounds.

The steam catalytic cracking reactor 130 may be operated at a temperature of greater than or equal to 525° C., greater than or equal to 550° C., greater than or equal to 575° C., or even greater than or equal to 600° C. The steam catalytic cracking reactor 130 may be operated at a temperature of less than or equal to 800° C., less than or equal to 750° C., less than or equal to 700° C., or even less than or equal to 675° C. The steam catalytic cracking reactor 130 may be operated at a temperature of from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a temperature of about 675° C. The process may operate at atmospheric pressure (approximately from 1 to 2 bar).

The methods of the present disclosure may include contacting the hydrocarbon feed 102 with the steam (water 120) in the presence of the cracking catalyst 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst 132 in the steam catalytic cracking reactor 130 for a residence time of from 1 second to 60 seconds, such as from 1 second to 30 seconds, from 1 second to 10 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of the time, the cracking catalyst may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of hydrocarbon and steam to the steam catalytic cracking reactor 130.

At the end of the conversion cycle, the flow of hydrocarbon feed 102 and water 120 may be stopped and the cracking catalyst 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 1, 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors 130 are taken off-line for regeneration of the nano-zeolite cracking catalyst 132, thus maintaining continuous operation of the steam catalytic cracking system 110.

Referring again to FIG. 1, during a regeneration cycle, the steam catalytic cracking reactor 130 may be operated to regenerate the cracking catalyst 132. The cracking catalyst 132 may be regenerated to remove coke deposits accumulated during the conversion cycle. To regenerate the cracking catalyst 132, hydrocarbon gas and liquid products produced by the steam catalytic cracking process may be evacuated from the steam catalytic cracking reactor 130. Nitrogen gas may be introduced to the steam catalytic cracking reactor 130 through gas inlet line 112 to evacuate the hydrocarbon gas and liquid products from the fixed bed steam catalytic cracking reactor 130. Nitrogen may be introduced to the steam catalytic cracking reactor 130 at gas hourly space velocity of from 10 per hour ($h^{-1}$) to 100 $h^{-1}$.

Following evacuation of the hydrocarbon gases and liquids, air may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air through the cracking catalyst 132 in the steam catalytic cracking reactor 130, the temperature of the steam catalytic cracking reactor 130 may be increased from the reaction temperature to a regeneration temperature of from 650° C. to 750° C. for a period of from 3 hours to 5 hours. The gas produced by air regeneration of the cracking catalyst 132 may be passed out of the steam catalytic cracking reactor 130 and may be analyzed by an in-line gas analyzer to detect the presence or concentration of carbon dioxide produced through de-coking of the cracking catalyst 132. Once the carbon dioxide concentration in the gases passing out of the steam catalytic cracking reactor 130 are reduced to less than 0.05% to 0.1% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst 132 for 15 to 30 minutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Referring again to FIG. 1, the steam catalytic cracking effluent 140 may pass out of the steam catalytic cracking reactor 130. The steam catalytic cracking effluent 140 may include one or more products and intermediates, such as but not limited to light hydrocarbon gases, light olefins, aromatic compounds, pyrolysis oil, or combinations of these. The light olefins in the steam catalytic cracking effluent 140 may include ethylene, propylene, butenes, or combinations of these.

As previously discussed, the cracking catalyst comprises a hierarchical mesoporous ZSM-5 zeolite. In embodiments, the cracking catalyst consists of or consists essentially of the hierarchical mesoporous ZSM-5 zeolite. In embodiments, the cracking catalyst may include the hierarchical mesoporous ZSM-5 zeolite catalyst without any other catalytic species impregnated into the hierarchical mesoporous zeolite, deposited on the surface of the hierarchical mesoporous ZSM-5 zeolite, or otherwise incorporated into the hierarchical mesoporous ZSM-5 zeolite.

Figure 2:
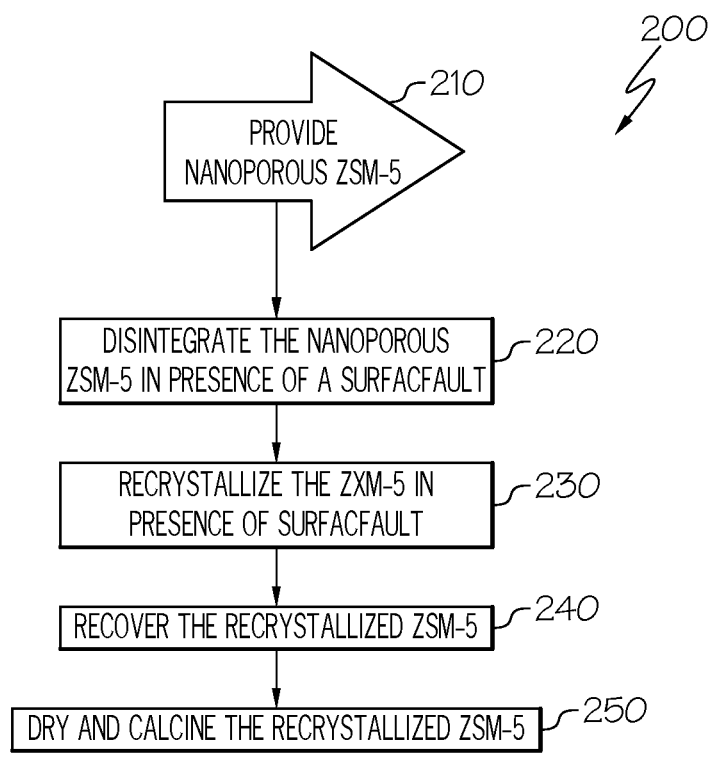
FIG. 2 depicts a flowchart of a method for producing a cracking catalyst comprising a hierarchical mesoporous ZSM-5 zeolite, according to one or more embodiments shown and described in the present disclosure.

Referring to FIG. 2, a process 200 for preparing the hierarchical mesoporous ZSM-5 zeolite may include providing a starting ZSM-5 zeolite, such as a microporous ZSM-5 zeolite, in step 210; disintegrating at least a portion of the starting ZSM-5 zeolite in a first mixture comprising the starting ZSM-5 zeolite, sodium hydroxide, and a surfactant, in step 220; after disintegrating at least a portion of the ZSM-5 zeolite, recrystallizing zeolite constituents in the presence of the surfactant to produce a recrystallized ZSM-5 zeolite in step 230; recovering the recrystallized ZSM-5 zeolite in step 240; and drying and calcining the recrystallized ZSM-5 zeolite in step 250. Calcining may remove the surfactant from the recrystallized ZSM-5 zeolite to produce the hierarchical mesoporous ZSM-5 zeolite having a hierarchical pore structure. The hierarchical pore structure of the hierarchical mesoporous ZSM-5 zeolite may include micropores and mesopores.

The starting ZSM-5 zeolite is a shape selective zeolite that can be active to catalytically-crack hydrocarbons to produce smaller hydrocarbon molecules, such as the light olefins, light aromatic compounds, or both. As used in the present disclosure, "ZSM-5" refers to zeolites having an MFI framework type according to the IUPAC zeolite nomenclature and consisting of silica and alumina. ZSM-5 refers to "Zeolite Socony Mobil-5" and is a pentasil family zeolite that can be represented by the chemical formula $Na_nAl_nSi_{96-n}O_{192} \cdot 16H_2O$, where $0<n<27$. The starting ZSM-5 zeolite can have a microporous pore structure with an average pore size of less than or equal to 2 nm. The starting ZSM-5 zeolite can have a molar ratio of silica to alumina of greater than or equal to 10 or greater than or equal to 20. The starting ZSM-5 zeolite can have a molar ratio of silica to alumina of less than or equal to 300, such as less than or equal to 200, less than or equal to 100, or even less than or equal to 40. In embodiments, the starting ZSM-5 zeolite can have a molar ratio of silica to alumina of from 10 to 300, from 10 to 200, from 10 to 100, from 10 to 50, from 20 to 300, from 20 to 200, from 20 to 100, from 20 to 50, or from 50 to 300. The starting ZSM-5 zeolite can be in the form of a plurality of particles, such as a plurality of spherical particles.

The starting ZSM-5 zeolite is then subjected to a disintegration process to disintegrate at least a portion of the starting ZSM-5 zeolite. As used in the present disclosure, the term "disintegration" refers to breaking down the ZSM-5 framework structure into its constituent oxides, such as alumina and silica, which are then dissolved into solution. Disintegrating at least a portion of the starting ZSM-5 zeolite may comprise first combining the starting ZSM-5 zeolite, the sodium hydroxide, and the surfactant to form the first mixture.

The first mixture may include a concentration of sodium hydroxide sufficient to breakdown the zeolite framework structure of portions of the starting ZSM-5 zeolite and dissolve the disintegrated alumina and silica into the first mixture. In embodiments, the first mixture may comprise a concentration of sodium hydroxide of from 0.2 molar (M) to 0.4 M. The surfactant may be cetyltrimethylammonium bromide (CTAB). The first mixture may include an amount of the surfactant sufficient to solubilize the constituents of the starting ZSM-5 zeolite following disintegration of those constituents and control formation of the mesopores during the recrystallization process. In embodiments, the first mixture can include a concentration of CTAB of from 4 wt. % to 5 wt. %, or 4.45 wt. %, based on the total weight of the first mixture. The first mixture may have a pH greater than 9, greater than or equal to 10, greater than or equal to 10.5, or even greater than or equal to 11. The pH may be from 9.5 to 14, from 9.5 to 13, from 9.5 to 12.5, from 9.5 to 12, from 10 to 14, from 10 to 13, from 10 to 12.5, from 10 to 12, from 10.5 to 14, from 10.5 to 13, from 10.5 to 12.5, from 10.5 to 12, from 11 to 14, from 11 to 13, from 11 to 12.5, or even from 11 to 12.

Disintegration may further comprise hydrothermally treating the first mixture, where hydrothermally treating the starting ZSM-5 zeolite in the presence of the sodium hydroxide and the surfactant causes the disintegration of portions of the starting ZSM-5 zeolite. Hydrothermally treating the first mixture may include heating the first mixture to a first hydrothermal treatment temperature of greater than or equal to 100° C., such as a temperature of from 100° C. to 150° C., while stirring the first mixture. Hydrothermally treating the first mixture may further include maintaining the first mixture under stirring at the temperature of greater than or equal to 100° C. or from 100° C. to 150° C. for a first hydrothermal treatment time. The first hydrothermal treatment time may be sufficient to disintegrate a portion but not all of the starting ZSM-5 zeolite. If the first hydrothermal treatment time to too long, all of the starting ZSM-5 zeolite may be disintegrated, which can make it difficult to initiate recrystallization of the zeolite constituents to form the hierarchical mesoporous ZSM-5 zeolite. If the first hydrothermal treatment time is too short, then insufficient disintegration of the ZSM-5 zeolite may lead to insufficient formation of mesopores in the hierarchical mesoporous ZSM-5 zeolite, which may limit the BET surface area and decrease the number of accessible reaction sites. In embodiments, the first hydrothermal treatment time may be from 10 hours to 30 hours, such as from 10 hours to 24 hours, from 14 hours to 30 hours from 14 hours to 24 hours, from 18 hours to 30 hours, from 18 hours to 24 hours, from 20 hours to 30 hours, or about 24 hours.

Following disintegration of at least a portion of the starting ZSM-5 zeolite in the first mixture, the alumina and silica constituents disintegrated and dissolved into the first mixture may then be recrystallized in the presence of the surfactant to produce the hierarchical pore structure of the hierarchical mesoporous ZSM-5 zeolite of the present disclosure. Recrystallizing the alumina and silica constituents that have been disintegrated from the starting ZSM-5 zeolite may include cooling the first mixture back to room temperature. Cooling the first mixture may include cooling the first mixture to a temperature of from 20° C. to 50° C., such as to a temperature of 25° C. After cooling, the recrystallizing may include adjusting the pH of the first mixture to a pH of 9.0 to produce a second mixture. The pH may be adjusted by adding a strong acid, such as but not limited to sulfuric acid. In embodiments, the strong acid may be added to the first mixture dropwise until the pH reaches 9.0. In embodiments, the pH can be adjusting with 2N sulfuric acid. The second mixture comprises the portions of the ZSM-5 zeolite particles not disintegrated, the surfactant, and the silica and alumina species disintegrated and dissolved into the second mixture.

After adjusting the pH, recrystallizing the ZSM-5 constituents may include stirring the second mixture for a second time period of from 10 hours to 30 hours, from 10 hours to 24 hours, from 14 hours to 30 hours from 14 hours to 24 hours, from 18 hours to 30 hours, from 18 hours to 24 hours, from 20 hours to 30 hours, or about 24 hours, and then hydrothermally treating the second mixture. Hydrothermally treating the second mixture can include heating the second mixture to a second hydrothermal treatment temperature of greater than or equal to 100° C., such as from 100° C. to 150° C., and maintaining the second mixture at the second hydrothermal treatment temperature under stirring for a third time period. The third time period may be sufficient to recrystallize the silica and alumina constituents of the ZSM-5 zeolite in the presence of the surfactant to produce the recrystallized ZSM-5 zeolite having a mesoporous structure to the recrystallized portion. In embodiments, the third time period can be from 10 hours to 30 hours, from 10 hours to 24 hours, from 14 hours to 30 hours from 14 hours to 24 hours, from 18 hours to 30 hours, from 18 hours to 24 hours, from 20 hours to 30 hours, or about 24 hours. Stirring the second mixture for the second time period and hydrothermally treating the second mixture for the third time period recrystallizes the alumina and silica constituents in the presence of the surfactant to produce the recrystallized ZSM-5 zeolite. In particular, during recrystallization, the alumina and silica constituents in the second mixture recrystallize in the presence of the surfactant to form a layer of ZSM-5 zeolite having a hierarchical porous structure onto the outer surfaces of the non-disintegrated portions of the starting ZSM-5 zeolite. The hierarchical porous structure of the layer of ZSM-5 zeolite recrystallized on the surfaces of the non-disintegrated portion of the starting ZSM-5 zeolite can include mesopores and micropores.

Following recrystallization, producing the hierarchical mesoporous ZSM-5 zeolite may include recovering the recrystallized ZSM-5 zeolite. Recovering the recrystallized ZSM-5 zeolite may include separating the recrystallized ZSM-5 zeolite particles from the second mixture, such as but not limited to filtering the second mixture to produce a filtrate comprising the recrystallized ZSM-5 zeolite particles. Other solid-liquid separation processes can be used instead of filtering. Following separation of the recrystallized ZSM-5 zeolite particles from the second mixture, the recrystallized ZSM-5 zeolite particles can be washed with water, such as distilled water or deionized water, to remove residual reagents of the second mixture from the surfaces and pores of the recrystallized ZSM-5 particles. After washing, recrystallized ZSM-5 zeolite particles can be dried at a drying temperature of 80° C. for a drying period of from 8 hours to 24 hours to produce a recrystallized ZSM-5 zeolite powder. The recrystallized ZSM-5 zeolite powder may then be calcined at a temperature of from 500° C. to 800° C. for a calcination period of from 5 hours to 24 hours to produce the hierarchical mesoporous ZSM-5 zeolite having the hierarchical pore structure.

In embodiments, the hierarchical mesoporous ZSM-5 zeolite can be ion-exchanged to produce the hydrogen form of the hierarchical mesoporous ZSM-5 zeolite. In hydrogen form, the Brønsted acid sites in the zeolite, also known as bridging OH—H groups, may form hydrogen bonds with other framework oxygen atoms in the zeolite framework. In embodiments, the method of producing the hierarchical mesoporous ZSM-5 zeolite may include ion-exchanging the hierarchical mesoporous ZSM-5 zeolite to produce the hydrogen form of the hierarchical mesoporous ZSM-5 zeolite. In embodiments, ion-exchanging the hierarchical mesoporous ZSM-5 zeolite may include treating the hierarchical mesoporous ZSM-5 zeolite with 0.25 normal (N) ammonium nitrate at 80° C. for 5 hours. In embodiments, the ion-exchanging process may be conducted a plurality of times, such as by treating the hierarchical mesoporous ZSM-5 zeolite with 0.25 N ammonium nitrate two times or more than two times at 80° C. for 5 hours each time. In embodiments, the hierarchical mesoporous ZSM-5 zeolite may be in hydrogen form.

The hierarchical mesoporous ZSM-5 zeolite can have a molar ratio of silica to alumina of greater than or equal to 10 or greater than or equal to 20. The hierarchical mesoporous ZSM-5 zeolite zeolite can have a molar ratio of silica to alumina of less than or equal to 300, such as less than or equal to 200, less than or equal to 100, or even less than or equal to 40. In embodiments, the hierarchical mesoporous ZSM-5 zeolite can have a molar ratio of silica to alumina of from 10 to 300, such as from 10 to 200, from 10 to 100, from 10 to 50, from 20 to 300, from 20 to 200, from 20 to 100, from 20 to 50, or from 50 to 300.

The hierarchical mesoporous ZSM-5 zeolite may be in the form of a plurality of particles. In embodiments, the hierarchical mesoporous ZSM-5 zeolite may have an average crystal size of greater than or equal to 50 nm, greater than or equal to 100 nm, or even greater than or equal to 200 nm. The hierarchical mesoporous ZSM-5 zeolite may have an average crystal size of less than or equal to 600 nm or less than or equal to 500 nm. In embodiments, the hierarchical mesoporous ZSM-5 zeolite may have an average crystal size of from 50 nm to 600 nm, from 50 nm to 500 nm, from 100 nm to 600 nm, from 100 nm to 500 nm, from 200 nm to 600 nm, or from 200 nm to 500 nm. The average crystal size is determined by scanning electron microscopy (SEM) according to known methods.

As previously discussed, the hierarchical mesoporous ZSM-5 zeolite of the present disclosure has a hierarchical pore structure comprising mesopores and micropores. Not intending to be limited by any particular theory, it is believed that the presence of the mesopores created by the surfactant assisted disintegration and recrystallization may produce a mesoporous structure that can increase the adsorption of larger hydrocarbon molecules from the hydrocarbon feed 102 into the zeolite pore structure, leading to enhanced conversion. The presence of mesopores in the crystalline framework of the hierarchical mesoporous ZSM-5 zeolites may be considered to be equivalent to increasing its external surface area, making a larger number of pore openings accessible to larger reactants, such as greater molecular weight hydrocarbon molecules. The mesopores may act as highways to facilitate molecular transport to and from the micropores, which harbor the active reaction sites. The creation of the mesopores in the hierarchical mesoporout ZSM-5 zeolite may also shorten the diffusion path length in the micropores leading to an improved transport and thus a more efficient use of ZSM-5 as a catalyst. The shortened diffusion path length means that target products like light olefins may be less susceptible to secondary reactions like hydrogenation or oligomerization. Increased molecular transport within the hierarchical mesoporous ZSM-5 zeolite of the present disclosure may reduce the probability of pore mouth coke formation and may increases the lifetime of the catalyst. The pore mouth coke formation is believed to be a result of clogging of heavy aromatics compounds form the hydrocarbon feed 102, which are restricted from entering into surface pores of microporous zeolites zeolite at higher temperatures.

In embodiments, the hierarchical mesoporous ZSM-5 zeolite may have a specific surface area of from 550 $m^2/g$ to 600 $m^2/g$, such as about 572 $m^2/g$. The specific surface area is determined according to the Brunauer-Emmett-Teller (BET) method. The specific surface area may be referred to throughout the present disclosure as the BET surface area. The BET surface area of the hierarchical mesoporous ZSM-5 zeolite can include the BET surface area provided by the mesoporous structure and the BET surface area provided by the microporous structure. The BET surface area provided by the mesopores is referred to throughout the present disclosure as the mesoporous BET surface area, which represents the surface area of internal surfaces of mesopores of the hierarchical mesoporous ZSM-zeolite as determined by the BET method. The BET surface area provided by the micropores is referred to throughout the present disclosure as the microporous BET surface area, which represents the surface area of internal surface of micropores of the hierarchical mesoporous ZSM-zeolite as determined by the BET method.

The hierarchical mesoporous ZSM-5 zeolite may have a mesoporous BET surface area that is greater than a microporous BET surface area of the hierarchical mesoporous ZSM-5 zeolite. In embodiments, the mesoporous BET surface area of the hierarchical mesoporous ZSM-5 zeolite may be greater than 50% of the total BET surface area of the hierarchical mesoporous ZSM-5 zeolite, such as greater than or equal to 52%, or even greater than or equal to 55% of the total BET surface area of the hierarchical mesoporous ZSM-5 zeolite. The balance of the total BET surface area can be the microporous BET surface area. In embodiments, the hierarchical mesoporous ZSM-5 zeolite may have a mesoporous BET surface area of from 300 $m^2/g$ to 400 $m^2/g$, or about 325 $m^2/g$.

The hierarchical mesoporous ZSM-5 zeolite may have a total pore volume of from 0.40 centimeter squared per gram ($cm^3/g$) to 0.50 $cm^3/g$, or about 0.45 $cm^3/g$. The total pore volume is determined from measured gas adsorption isotherms through Non-Local Density Functional Theory (NLDFT) modeling and analysis. The BET method is also used to determine the total pore volume. The total pore volume of the hierarchical mesoporous ZSM-5 zeolite includes the pore volume provided by the mesopores and the pore volume provided by the micropores. The pore volume provided by the mesopores is referred to throughout the present disclosure as the mesopore volume, and the pore volume provided by the micropores is referred to throughout the present disclosure as the micropore volume.

The hierarchical mesoporous ZSM-5 zeolite may have a mesopore volume that is greater than a micropore volume of the hierarchical mesoporous ZSM-zeolite. In embodiments, the mesopore volume of the hierarchical mesoporous ZSM-zeolite may be greater than 50% of the total pore volume of the hierarchical mesoporous ZSM-zeolite, such as greater than or equal to 60%, greater than or equal to 65%, or about 67% of the total pore volume of the hierarchical mesoporous ZSM-5 zeolite. The remainder of the total pore volume may be the micropore volume. In embodiments, the hierarchical mesoporous ZSM-5 zeolite may have a mesopore volume of from 0.25 $cm^3/g$ to 0.35 $cm^3/g$, from 0.30 $cm^3/g$ to 0.35 $cm^3/g$, or about 0.31 $cm^3/g$.

In embodiments, the hierarchical mesoporous ZSM-5 zeolite may not include any heteroatoms substituted into the framework of the zeolite. Heteroatoms substituted into the zeolite framework refer to elements such metals or metalloids substituted into the zeolite framework in place of silicon, aluminum, or both. In embodiments, the cracking catalyst can include the hierarchical mesoporous ZSM-5 zeolite without any other catalytic species impregnated onto or otherwise deposited onto the surfaces of the hierarchical mesoporous ZSM-5 zeolite or into the pores of the hierarchical mesoporous ZSM-5 zeolite. In embodiments, the hierarchical mesoporous ZSM-5 zeolite may be substantially free of impregnated metals, metalloids, or oxides thereof, such as having less than or equal to 0.01 wt. % impregnated metals, metalloids, or oxides thereof based on the total weight of the hierarchical mesoporous ZSM-5 zeolite. The presence of impregnated metals, metalloids, or oxides of these can change the catalytic properties of the hierarchical mesoporous ZSM-5 zeolite for converting crude oil to light olefins, light aromatic compounds or both through steam catalytic cracking. The cracking catalyst may comprise individual particles of the hierarchical mesoporous ZSM-5 zeolite having an average particle size of from 400 micrometers (μm) to 600 μm. In embodiments, the cracking catalyst may consist of or consist essentially of the hierarchical mesoporous ZSM-5 zeolite. In embodiments, the cracking catalyst does not include any binders, matrix materials, or other catalytic species supported on the hierarchical mesoporous ZSM-5 zeolite.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system 130. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140.

The gaseous effluent 164 may include olefins, such as ethylene, propylene, butenes, or combinations of these; light hydrocarbon gases, such as methane, ethane, propane, n-butane, i-butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include naphtha, kerosene, diesel, vacuum gas oil (VGO), or combinations of these. The liquid hydrocarbon effluent 172 may include at 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion to olefins. The aqueous effluent 174 may include water and water soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the hierarchical mesoporous ZSM-5 zeolite produced by previously described processes may be used as a catalyst in a fluidized catalytic cracking (FCC) reactor. The FCC reactor may be a fluidized bed reactor. In the FCC reactor, the cracking catalyst consisting of the hierarchical mesoporous ZSM-5 zeolite may be contacted with the hydrocarbon feed, such as crude oil, in the presence of steam to produce light olefins, light aromatic compounds, or combinations of these. In embodiments, the cracking catalyst consists of the hierarchical mesoporous ZSM-5 zeolite. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the hierarchical mesoporous ZSM-5 zeolite. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the cracking catalyst in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the cracking catalyst to hydrocarbon (catalyst to oil) weight ratio in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The cracking effluent from the FCC reactor can be separated into various product streams, intermediate streams, and an aqueous stream in a separation system downstream of the FCC reactor.

EXAMPLES

The various aspects of the present disclosure will be further clarified by the following examples. The examples are illustrative in nature and should not be understood to limit the subject matter of the present disclosure.

Examples 1-3: Preparation of Cracking Catalyst

In Examples 1-3, the hierarchical mesoporous ZSM-5 zeolites of the present disclosure having different molar ratios of silica to alumina were prepared. To prepare the cracking catalyst, 7 grams of a starting preformed ZSM-5 zeolite was added to a glass reactor along with a sodium hydroxide (NaOH) solution in water and the surfactant cetyltrimethylammonium bromide (CTAB) to produce the basic mixture. The concentration of CTAB in the basic mixture was 4.45 wt. % based on the total weight of the basic mixture (including the CTAB, NaOH, water, and the starting ZSM-5 zeolite). The starting ZSM-5 zeolites, the molar ratio of silica to alumina in each starting ZSM-5 zeolite, and the concentration of NaOH in the basic solution for each of Examples 1-3 are provided in Table 3.

TABLE 3

| Example | Zeolite Model | Zeolite Supplier | Silica to Alumina Molar Ratio | NaOH in Basic Mixture (M) |
|---|---|---|---|---|
| 1 | HSZ-840 NHA | Tosoh Europe BV | 40 | 0.20 |
| 2 | CBV-28014 | Zeolite International | 28 | 0.40 |
| 3 | CBV-2314 | Zeolite International | 23 | 0.40 |

For each of Examples 1-3, the starting preformed ZSM-5 zeolite was then disintegrated by gradual heating the basic mixture comprising the ZSM-5 zeolite, NaOH, and CTAB to 100° C. and stirring at 100° C. for a first hydrothermal treatment period of 24 hours. Following the first hydrothermal treatment, the hydrothermally treated mixture was then cooled down, and the pH was adjusted to 9.0 through addition of dilute sulfuric acid (2N) to produce an acidic mixture. The acidic mixture was then stirred for 24 hours and aged at 100° C. for another 24 hours. The solid product was filtered, washed thoroughly using distilled water, dried at 80° C. overnight, then calcined at 570° C. for 6 hours to remove the CTAB surfactant to produce the hierarchical mesoporous ZSM-5 zeolites of Examples 1-3. The hierarchical mesoporous ZSM-5 zeolites were each treated with 0.25 normality (N) ammonium nitrate twice at 80° C. for 5 hours to ion-exchange the hierarchical mesoporous ZSM-5 zeolite in the hydrogen form of the hierarchical mesoporous ZSM-5 zeolite.

Figure 3:
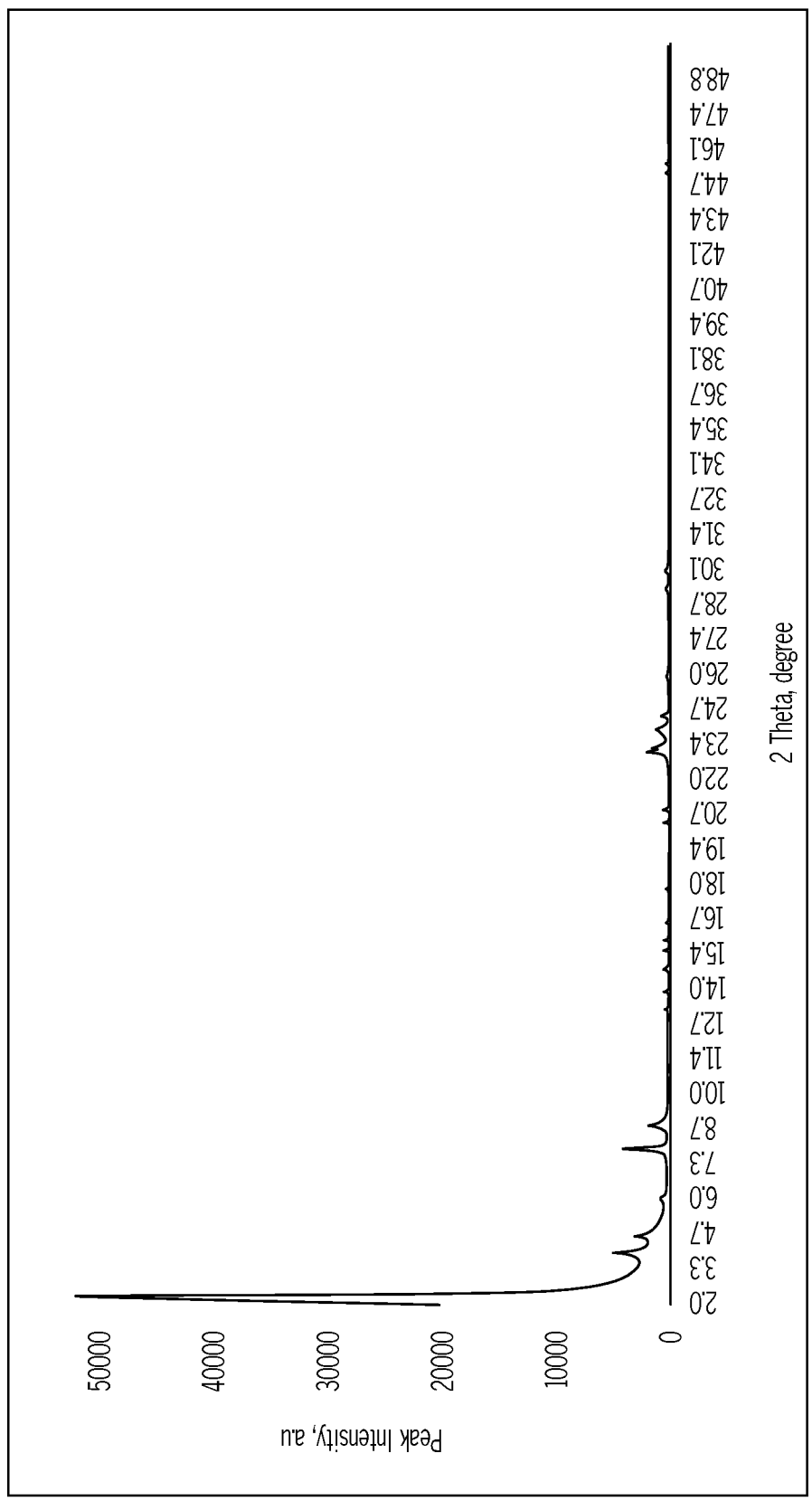
FIG. 3 graphically depicts an X-Ray Diffraction (XRD) spectrum for a hierarchical mesoporous ZSM-5 zeolite, according to one or more embodiments shown and described in the present disclosure.
Figure 4:
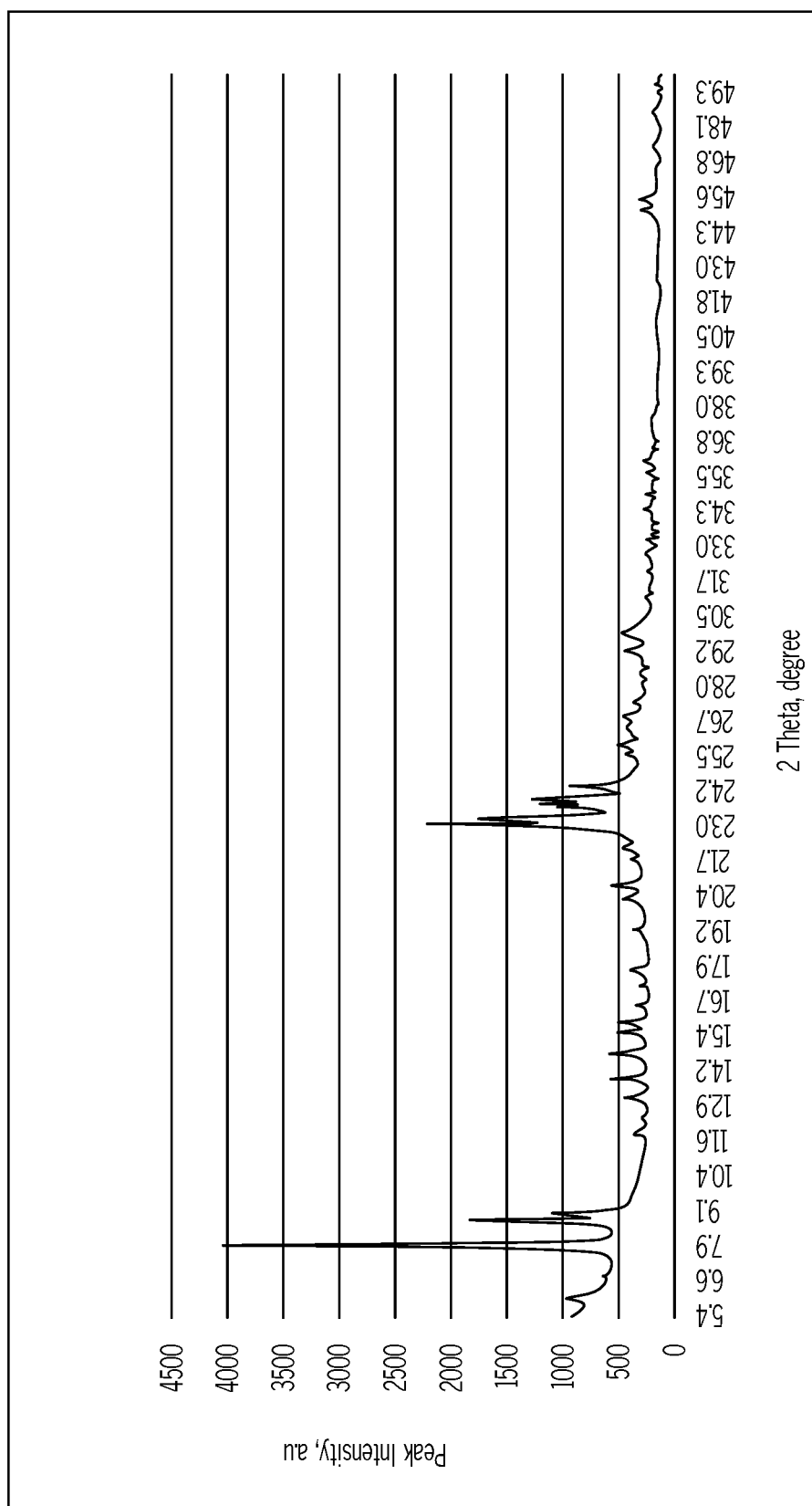
FIG. 4 graphically depicts a section of the XRD spectrum of FIG. 3 in the region from 5.4 nanometers to 49 nanometers, according to one or more embodiments shown and described in the present disclosure.

The hierarchical mesoporous ZSM-5 zeolite catalyst of Example 1 comprising a silica to alumina molar ratio of 40 was subjected to X-Ray Diffraction (XRD) according to known methods. Referring now to FIGS. 3 and 4, an XRD spectrum for the hierarchical mesoporous ZSM-5 zeolite of Example 1 is graphically depicted. The mesoporous phase is clearly established by the low angle peaks at 0=0.2 to 0=4.5. FIG. 4 zooms in on the XRD spectrum over the wavelength range of 5.4 nm to 49 nanometers.

The BET surface area and total pore volume of the hierarchical mesoporous ZSM-5 zeolite of Example 1 were determined. The hierarchical mesoporous ZSM-5 zeolite of Example 1 had a total BET surface area of 572 $m^2/g$. The hierarchical mesoporous ZSM-5 zeolite of Example 1 was found to have a mesoporus BET surface area of 325 $m^2/g$, which is the portion BET surface area contributed by the mesopores. The microporous BET surface area of the hierarchical mesoporus ZSM-5 zeolite of Example 1 was found to be 247 $m^2/g$. The mesoporous BET surface area represented about 57% of the total BET surface area of the hierarchical mesoporous ZSM-5 zeolite of Example 1.

The hierarchical mesoporous ZSM-5 zeolite of Example 1 had a total pore volume of 0.45 $cm^3/g$, where the total pore volume was determined from measured gas adsorption isotherms through NLDFT modeling and analysis. The mesopore volume and micropore volume were also determined. The hierarchical mesoporous ZSM-5 zeolite of Example 1 was found to have a micropore volume of 0.14 $cm^3/g$ and a mesopore volume of 0.31 $cm^3/g$. The mesopore volume represented about 67% of the total pore volume of the hierarchical mesoporous ZSM-5 zeolite of Example 1.

Comparative Example 4: Unimix 75

For Comparative Example 4, a commercial cracking catalyst was provided for comparison to the hierarchical mesoporous ZSM-5 zeolites of Examples 1-3. The commercial cracking catalyst of Comparative Example 4 was a mixture that included 75 wt. % of Equilibrium Catalyst (ECAT) and 25 wt. % of commercially available ZSM-5 (commercially available as OlefinsUltra® from W.R. Grace and Company) (referred to as "UMIX75") was prepared.

Example 5: Cracking Catalyst Evaluation

In Example 5, the cracking catalysts of Examples 1-3 and the commercial cracking catalyst of Comparative Example 4 were evaluated at atmospheric pressure in a fixed-bed reaction (FBR) system for steam catalytic cracking of crude oil such as AXL crude oil. The general make-up of the AXL crude oil is provided in Table 4. The cracked gaseous and liquid products were characterized by off-line gas chromatographic (GC) analysis using simulated distillation and naphtha analysis techniques.

Referring now to FIG. 5, the FBR system 300 for conducting the experiments of Example 5 is schematically depicted. AXL crude oil 301 was fed to a fixed-bed reactor 340 using a metering pump 311. A constant feed rate of 2 g/h of the AXL crude oil 301 was used. Water 302 was fed to the fixed bed reactor 340 using a metering pump 312. Water 302 was preheated using a preheater 321. A constant feed rate of 1 g/h of water 302 was used. Nitrogen 303 was used as a carrier gas at 65 mL/min. Nitrogen 303 was fed to the fixed bed reactor 340 using a Mass Flow Controller (MFC) 313. Nitrogen 303 was preheated using a preheater 322. Water 302 and Nitrogen 303 were mixed using a mixer 330 and the mixture was introduced to the fixed-bed reactor 340. Prior to entering the reactor tube, the AXL crude oil 301, water 302, and nitrogen 303 were preheated up to 250° C. in the pre-heating zone 342. The pre-heating zone 342 was preheated using line heaters 331. Crude oil 301 was introduced from the top of the reactor 240 through the injector 341 and mixed with steam in the top two-third of the reactor tube 340 before reaching the catalyst bed 344.

The catalyst bed 344 in the reactor tube 340 was moved a few centimeters down to allow more time for pre-heating of AXL crude oil 301 prior to contacting with the cracking catalyst in the catalyst bed 344. For each experiment, 1 gram (g) of cracking catalyst having a mesh size of 30-40 was placed at the center of the reactor tube 340, supported by quartz wool 343, 346 and a reactor insert 345. Quartz wool 343, 346 was placed both at the bottom and top of the catalyst bed 344 to keep it in position. The height of the catalyst bed 344 was 1-2 cm. The cracking catalysts of Examples 1-3 comprising the hierarchical mesoporous ZSM-5 zeolite and the comparative cracking catalyst of Comparative Example 4 were each used as the cracking catalyst a different experiment conducted for Example 5. Prior to conducting the steam catalytic cracking reaction, each of the cracking catalysts of Examples 1-3 and the commercial cracking catalyst of Comparative Example 4 were steam deactivated in the presence of steam at a temperature of 810° C. for 6 hours.

Following steam deactivation, the crude oil hydrocarbon feed and the water/steam were introduced to the reaction tube of the FBR. The reaction was allowed to take place for 45-60 min, until steady state was reached. The mass ratio of steam to crude oil was 0.5 grams of steam per gram of crude oil. The crude oil was cracked at a cracking temperature of 675° C. and a weight ratio of catalyst to crude oil of 1:2. The residence time of the crude oil and the steam in the fixed bed reactor 340 was 10 seconds. The total time on stream for each individual experiment of Example 5 was 5 hours.

Figure 6:
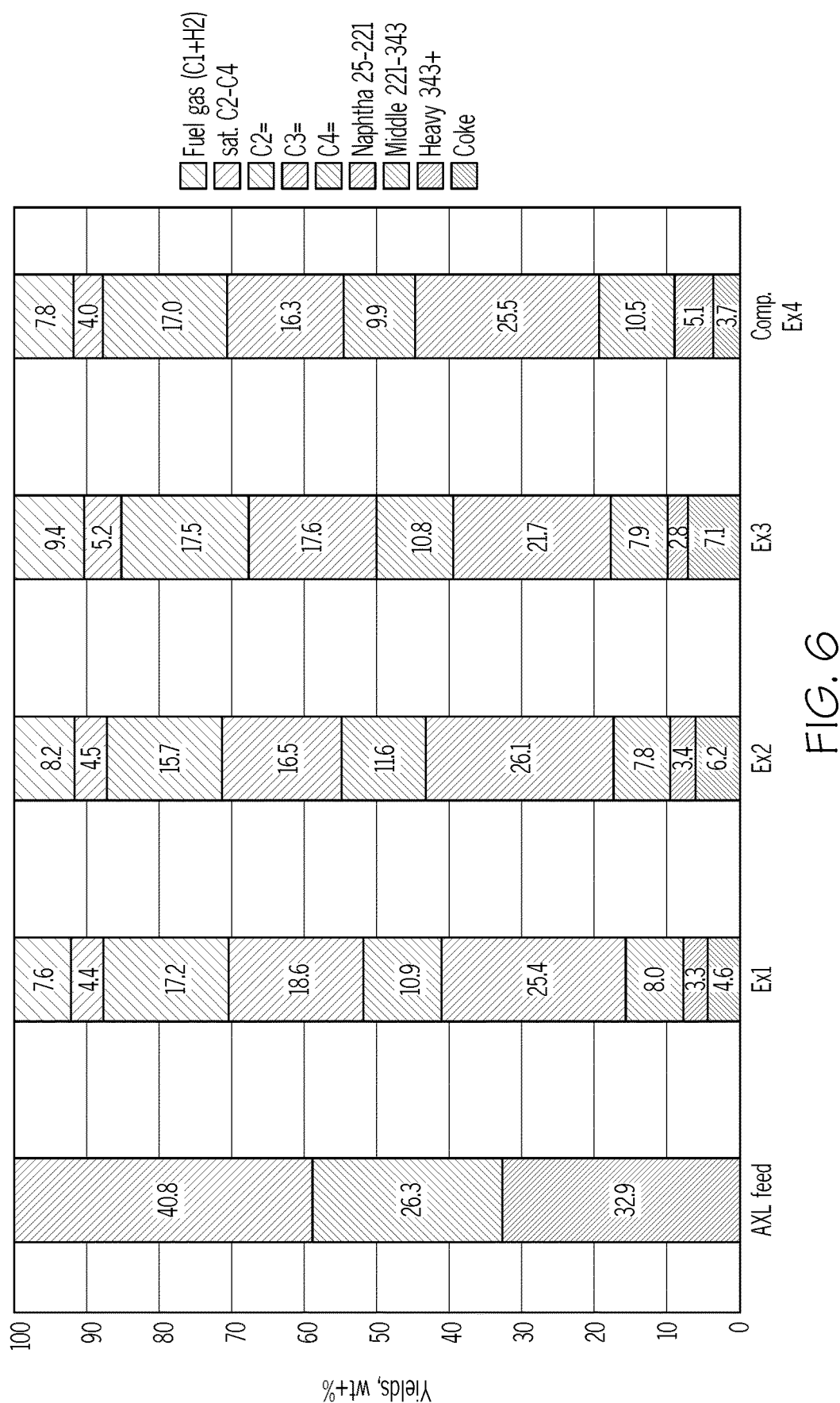
FIG. 6 graphically depicts product yields obtained from cracking an AXL crude oil with cracking catalysts of Examples 1-3 and Comparative Example 4, according to one or more embodiments shown and described in the present disclosure.

The cracking reaction product stream 345 was introduced to a gas-liquid separator 351. A Wet Test Meter 352 was placed downstream of the gas-liquid separator 351. The cracked gaseous products 361 and liquid products 362 were characterized by off-line gas chromatographic (GC) analysis using simulated distillation and naphtha analysis techniques. The reaction product streams from the cracking reaction were analyzed for yields of ethylene, propylene, and butylene. The yield analyses for Example 5 are depicted in FIG. 6 and provided numerically in Table 4.

TABLE 4

| | Stream | | | | |
|---|---|---|---|---|---|
| | Feed | Effluent | Effluent Catalyst | Effluent | Effluent |
| | — | Example 1 | Example 2 | Example 3 | Comparative Example 4 |
| Temperature (° C.) | — | 675 | 675 | 675 | 675 |
| Steam/Oil Weight Ratio | — | 0.5 | 0.5 | 0.5 | 0.5 |
| Residence Time (seconds) | — | 10 | 10 | 10 | 10 |
| Fuel Gas ($C_1$ & $H_2$) (wt. %) | — | 7.6 | 8.2 | 9.4 | 7.8 |
| Saturated $C_2$-$C_4$ (wt. %) | — | 4.4 | 4.5 | 5.2 | 4.0 |
| Ethylene (wt. %) | — | 17.2 | 15.7 | 17.5 | 17.0 |
| Propylene (wt. %) | — | 18.6 | 16.5 | 17.6 | 16.3 |
| Total Butenes (wt. %) | — | 10.9 | 11.6 | 10.8 | 9.9 |
| Naphtha (15° C.-221° C.) (wt. %) | 40.8 | 25.4 | 26.1 | 21.7 | 25.5 |
| Middle Distillate (221° C.-343° C.) (wt. %) | 26.3 | 8.0 | 7.8 | 7.9 | 10.5 |
| Heavy (343° C.+) (wt. %) | 32.9 | 3.3 | 3.4 | 2.8 | 5.1 |
| Coke (wt. %) | — | 4.6 | 6.2 | 7.1 | 3.9 |
| Total (wt. %) | 100 | 100 | 100 | 100 | 100 |
| Total Light Olefins (wt. %) | 0.0 | 46.7 | 43.8 | 45.9 | 43.2 |

The yields in Table 4 are expressed in units of weight percent based on the total weight of the stream.

The results in Table 4 and in FIG. 6 show that the hierarchical mesoporous ZSM-5 zeolites of Examples 1-3 can directly convert crude oil into petrochemical products, such as light olefins and aromatic compounds. From the results, it can be seen that hierarchical mesoporous ZSM-5 zeolites of Examples 1-3 provide high yields of light olefins, which include the ethylene, propylene, and total butenes. In fact, each of the hierarchical mesoporous ZSM-5 zeolites of Examples 1-3 produced a total yield of light olefins greater than the yield of light olefins using the commercial cracking catalyst of Comparative Example 4. The hierarchical mesoporous ZSM-5 zeolites of Examples 1 and 3 produced substantially greater yields of total light olefins compared to the commercial cracking catalyst of Comparative Example 4.

Additionally, the hierarchical mesoporous ZSM-5 zeolites of Examples 1-3 resulted in greater conversion of the middle distillates and heavy distillate portion of the hydrocarbon feed, as shown by the reduced concentration of middle distillates and heavy distillates in the cracking effluent produced using the hierarchical mesoporous ZSM-5 zeolites in Examples 1-3 compared to the cracking effluent produced using the commercial cracking catalyst of Comparative Example 4. Without being bound by any particular theory, it is believed that the mesopores created by disintegration and recrystallization in the presence of the surfactant provide greater access to catalytically active sites for the larger hydrocarbon molecules present in the middle distillate and heavy distillate fractions of the crude oil hydrocarbon feed, which may result in greater conversion of the larger hydrocarbon molecules in the middle and heavy distillate fractions by the hierarchical mesoporous ZSM-5 zeolites of Examples 1-3 compared to the commercial cracking catalyst of Comparative Example 4. Further, it was found that the hierarchical mesoporous ZSM-5 zeolites of Examples 1-3 demonstrated high hydrothermal stability and long activity life during the steam catalytic cracking of Example 5. This is demonstrated by the continued catalytic activity of the hierarchical mesoporous ZSM-5 zeolite catalysts of Examples 1-3 after 6 hours of steam deactivation and 5 hours of on-stream reaction time.

A first aspect of the present disclosure may be directed to a process for upgrading a hydrocarbon feed, where the process may comprise contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst may comprise, consist of, or consist essentially of a hierarchical mesoporous ZSM-5 zeolite.

A second aspect of the present disclosure may include the first aspect, where the hierarchical mesoporous ZSM-5 zeolite may comprise a molar ratio of silica to alumina of from 10 to 300.

A third aspect of the present disclosure may include any one of the first or second aspects, where the hierarchical mesoporous ZSM-5 zeolite may have a crystal size of from 50 nanometers to 600 nanometers.

A fourth aspect of the present disclosure may include any one of the first through third aspects, where the hierarchical mesoporous ZSM-zeolite may comprise a hierarchical pore structure comprising mesopores and micropores.

A fifth aspect of the present disclosure may include any one of the first through fourth aspects, where the hierarchical mesoporous ZSM-zeolite may have a total BET surface area of from 500 m$^2$/g to 600 m$^2$/g.

A sixth aspect of the present disclosure may include any one of the first through fifth aspects, where the hierarchical mesoporous ZSM-zeolite may have a mesoporous BET surface area of from 300 m$^2$/g to 400 m$^2$/g, where the mesoporous BET surface area is a surface area of internal surfaces of the mesopores as determined by the BET method.

A seventh aspect of the present disclosure may include any one of the first through sixth aspects, where the hierarchical mesoporous ZSM-zeolite may have a mesoporous BET surface area that is greater than a microporous BET surface area, where the mesoporous BET surface area is a surface area of internal surfaces of mesopores of the hierarchical mesoporous ZSM-zeolite as determined by the BET method, and the microporous BET surface area is a surface area of internal surface of micropores of the hierarchical mesoporous ZSM-zeolite as determined by the BET method.

An eighth aspect of the present disclosure may include the seventh aspect, where the mesoporous BET surface area of the hierarchical mesoporous ZSM-zeolite may be greater than or equal to 50% of a total BET surface area of the hierarchical mesoporous ZSM-zeolite.

A ninth aspect of the present disclosure may include any one of the first through eighth aspects, where the hierarchical mesoporous ZSM-zeolite may have a total pore volume of from 0.4 cm$^3$/g to 0.5 cm$^3$/g, where the total pore volume includes a mesopore volume and a micropore volume of the hierarchical mesoporous ZSM-zeolite.

A tenth aspect of the present disclosure may include any one of the first through ninth aspects, where the hierarchical mesoporous ZSM-zeolite may have an average mesopore volume of from 0.25 cm$^3$/g to 0.35 cm$^3$/g, where the mesopore volume is a pore volume of mesopores of the hierarchical mesoporous ZSM-zeolite.

An eleventh aspect of the present disclosure may include any one of the first through tenth aspects, where the hierarchical mesoporous ZSM-zeolite may have a mesopore volume that is greater than a micropore volume, where the mesopore volume is a pore volume of mesopores of the hierarchical mesoporous ZSM-zeolite, and the micropore volume is a pore volume of micropores of the hierarchical mesoporous ZSM-zeolite.

A twelfth aspect of the present disclosure may include the eleventh aspect, where the mesopore volume of the hierarchical mesoporous ZSM-zeolite may be greater than or equal to 60% of the total pore volume of the hierarchical mesoporous ZSM-zeolite.

A thirteenth aspect of the present disclosure may include any one of the first through twelfth aspects, where the hierarchical mesoporous ZSM-5 zeolite may be prepared by a method comprising providing a starting ZSM-5 zeolite; disintegrating at least a portion of the ZSM-5 zeolite in a first mixture comprising the starting ZSM-5 zeolite, sodium hydroxide, and a surfactant at a temperature of 100° C. for a first time period; after the disintegrating the at least a portion of the ZSM-5 zeolite, recrystallizing zeolite constituents in the presence of the surfactant to produce a recrystallized ZSM-5 zeolite; recovering the recrystallized ZSM-5 zeolite; and calcining the recrystallized ZSM-5 zeolite, where the calcining may remove the surfactant from the recrystallized ZSM-5 zeolite to produce the hierarchical mesoporous ZSM-5 zeolite having a hierarchical pore structure.

A fourteenth aspect of the present disclosure may include the thirteenth aspect, further comprising, after calcining, treating the hierarchical mesoporous ZSM-5 zeolite with 0.25 N ammonium nitrate twice at 80° C. for 5 hours, where the treating with the ammonium nitrate may ion-exchange the hierarchical mesoporous ZSM-5 zeolite to produce the hierarchical mesoporous ZSM-5 zeolite in hydrogen form.

A fifteenth aspect of the present disclosure may include either one of the thirteenth or fourteenth aspects, where disintegrating the at least a portion of the starting ZSM-5 zeolite may comprise combining the starting ZSM-5 zeolite, the sodium hydroxide, and the surfactant to form the first mixture; heating the first mixture to a temperature of 100° C. while stirring; and maintaining the first mixture at the temperature of 100° C. and stirring for a period of from 10 hours to 30 hours.

A sixteenth aspect of the present disclosure may include any one of the thirteenth through fifteenth aspects, where recrystallizing the ZSM-5 zeolite constituents may comprise cooling the first mixture to a temperature of from 20° C. to 50° C.; adjusting the pH of the first mixture to a pH of 9.0 to produce a second mixture; stirring the second mixture for a second time period of from 10 hours to 30 hours; and hydrothermally treating the second mixture by increasing the temperature to 100° C. and stirring for a third period of from 10 hours to 30 hours, where stirring for the second time period and hydrothermally treating the second mixture for the third period may recrystallize the zeolite constituents in the presence of the surfactant to produce the recrystallized ZSM-5 zeolite.

A seventeenth aspect of the present disclosure may include any one of the thirteenth through sixteenth aspects, where recovering the recrystallized ZSM-5 zeolite may comprise filtering the second solution to produce a filtrate comprising the recrystallized ZSM-5 zeolite; washing the filtrate with distilled water; and drying the filtrate at 80° C. for a period of from 8 hours to 24 hours to produce the recrystallized ZSM-5 zeolite.

An eighteenth aspect of the present disclosure may include any one of the thirteenth through seventeenth aspects, comprising calcining the recrystallized ZSM-5 zeolite at a temperature of from 500° C. to 800° C. for a calcination period of from 5 hours to 24 hours.

A nineteenth aspect of the present disclosure may include any one of the thirteenth through eighteenth aspects, where the first mixture may comprise a concentration of sodium hydroxide of from 0.20 molar (M) to 0.4 (M).

A twentieth aspect of the present disclosure may include any one of the thirteenth through nineteenth aspects, where the surfactant may comprise cetyltrimethylammonium bromide (CTAB).

A twenty-first aspect of the present disclosure may include the twentieth aspect, where a concentration of the CTAB in the first mixture may be 4 weight percent to 5 weight percent based on the total weight of the first mixture.

A twenty-second aspect of the present disclosure may include any one of the thirteenth through twenty-first aspects, where the hierarchical mesoporous ZSM-5 zeolite may comprise a molar ratio of silica to alumina that is the same as a molar ratio of silica to alumina of the starting ZSM-5 zeolite.

A twenty-third aspect of the present disclosure may include any one of the first through twenty-second aspects, where the hydrocarbon feed may comprise a whole crude oil having an API gravity between 25 and 50.

A twenty-fourth aspect of the present disclosure may include any one of the first through twenty-third aspects, where the hydrocarbon feed may be a heavy crude oil, a light crude oil, an extra light crude oil, or combinations of these.

A twenty-fifth aspect of the present disclosure may include any one of the first through twenty-fourth aspects, where the steam catalytic cracking effluent may comprise olefins and the olefins may comprise one or more of ethylene, propylene, butenes, or combinations of these.

A twenty-sixth aspect of the present disclosure may include any one of the first through twenty-fifth aspects, comprising contacting the hydrocarbon feed with the steam in the presence of the cracking catalyst in a cracking reactor, where the cracking reactor may comprise one or more fixed bed reactors, fluidized bed reactor, batch reactor, moving bed catalytic cracking reactor, fluidized catalytic cracking (FCC) reactor, or combinations of these.

A twenty-seventh aspect of the present disclosure may include any one of the first through twenty-sixth aspects, comprising contacting the hydrocarbon feed with the steam in the presence of the cracking catalyst at a reaction temperature of from 500° C. to 800° C.

A twenty-eighth aspect of the present disclosure may include any one of the first through twenty-seventh aspects, comprising contacting the hydrocarbon feed with the steam in the presence of the cracking catalyst at a mass ratio of steam to hydrocarbons of from 0.2 to less than 1.

A twenty-ninth aspect of the present disclosure may include any one of the first through twenty-eighth aspects, comprising contacting the hydrocarbon feed with the steam in the presence of the cracking catalyst at a cracking catalyst to hydrocarbon weight ratio of from 3 to 40.

A thirtieth aspect of the present disclosure may include any one of the first through twenty-ninth aspects, comprising contacting the hydrocarbon feed with the steam in the presence of the cracking catalyst for a residence time of from 1 second to 60 seconds.

A thirty-first aspect of the present disclosure may include any one of the first through thirtieth aspects, where a yield of light olefins from the process may be from 30 wt. % to 60 wt. % based on the total weight of the steam catalytic cracking effluent.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading a hydrocarbon feed, the process comprising: contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both, where:
    the light olefins are selected from the group consisting of ethylene, propylene, butenes, and combinations thereof;
    the light aromatic compounds are selected from the group consisting of benzene, toluene, ethylbenzene, xylenes, and combinations thereof;
    the cracking catalyst consists essentially of a hierarchical mesoporous ZSM-5 zeolite; and
    the hierarchical mesoporous ZSM-5 zeolite comprises a molar ratio of silica to alumina of from 10 to 40.

2. The process of claim 1, where the hierarchical mesoporous ZSM-5 zeolite has a crystal size of from 50 nanometers to 600 nanometers.

3. The process of claim 1, where the hierarchical mesoporous ZSM-zeolite comprises a hierarchical pore structure comprising mesopores and micropores.

4. The process of claim 1, where the hierarchical mesoporous ZSM-zeolite has a total BET surface area of from 500 $m^2/g$ to 600 $m^2/g$, and a mesoporous BET surface area of from 300 $m^2/g$ to 400 $m^2/g$, where the mesoporous BET surface area is a surface area of internal surfaces of the mesopores as determined by the BET method.

5. The process of claim 1, where the hierarchical mesoporous ZSM-zeolite has a mesoporous BET surface area that is greater than a microporous BET surface area, where the mesoporous BET surface area is a surface area of internal surfaces of mesopores of the hierarchical mesoporous ZSM-zeolite as determined by the BET method, and the microporous BET surface area is a surface area of internal surface of micropores of the hierarchical mesoporous ZSM-zeolite as determined by the BET method.

6. The process of claim 5, where the mesoporous BET surface area of the hierarchical mesoporous ZSM-zeolite is greater than or equal to 50% of a total BET surface area of the hierarchical mesoporous ZSM-zeolite.

7. The process of claim 1, where the hierarchical mesoporous ZSM-zeolite has a total pore volume of from 0.4 cm³/g to 0.5 cm³/g, where the total pore volume includes a mesopore volume and a micropore volume of the hierarchical mesoporous ZSM-zeolite.

8. The process of claim 1, where the hierarchical mesoporous ZSM-zeolite has a mesopore volume that is greater than a micropore volume, where the mesopore volume is a pore volume of mesopores of the hierarchical mesoporous ZSM-zeolite, and the micropore volume is a pore volume of micropores of the hierarchical mesoporous ZSM-zeolite.

9. The process of claim 8, where the mesopore volume of the hierarchical mesoporous ZSM-zeolite is greater than or equal to 60% of the total pore volume of the hierarchical mesoporous ZSM-zeolite.

10. The process of claim 1, where the hierarchical mesoporous ZSM-5 zeolite is prepared by a method comprising:
providing a starting ZSM-5 zeolite;
disintegrating at least a portion of the ZSM-5 zeolite in a first mixture comprising the starting ZSM-5 zeolite, sodium hydroxide, and a surfactant at a temperature of 100° C. for a first time period;
after the disintegrating the at least a portion of the ZSM-5 zeolite, recrystallizing zeolite constituents in the presence of the surfactant to produce a recrystallized ZSM-5 zeolite;
recovering the recrystallized ZSM-5 zeolite; and
calcining the recrystallized ZSM-5 zeolite, where the calcining removes the surfactant from the recrystallized ZSM-5 zeolite to produce the hierarchical mesoporous ZSM-5 zeolite having a hierarchical pore structure.

11. The process of claim 10, further comprising, after calcining, treating the hierarchical mesoporous ZSM-5 zeolite with 0.25 N ammonium nitrate twice at 80° C. for 5 hours, where the treating with the ammonium nitrate ion-exchanges the hierarchical mesoporous ZSM-5 zeolite to produce the hierarchical mesoporous ZSM-5 zeolite in hydrogen form.

12. The process of claim 10, where disintegrating the at least a portion of the starting ZSM-5 zeolite comprises:
combining the starting ZSM-5 zeolite, the sodium hydroxide, and the surfactant to form the first mixture;
heating the first mixture to a temperature of 100° C. while stirring; and
maintaining the first mixture at the temperature of 100° C. and stirring for a period of from 10 hours to 30 hours.

13. The process of claim 10, where recrystallizing the ZSM-5 zeolite constituents comprises:
cooling the first mixture to a temperature of from 20° C. to 50° C.;
adjusting the pH of the first mixture to a pH of 9.0 to produce a second mixture;
stirring the second mixture for a second time period of from 10 hours to 30 hours; and
hydrothermally treating the second mixture by increasing the temperature to 100° C. and stirring for a third period of from 10 hours to 30 hours, where stirring for the second time period and hydrothermally treating the second mixture for the third period recrystallizes the zeolite constituents in the presence of the surfactant to produce the recrystallized ZSM-5 zeolite.

14. The process of claim 10, where the surfactant comprises cetyltrimethylammonium bromide (CTAB), and the concentration of the CTAB in the first mixture is from 4 weight percent to 5 weight percent based on the total weight of the first mixture.

15. The process of claim 1, where the hydrocarbon feed comprises a whole crude oil having an API gravity between 25 and 50.

16. The process of claim 1, where the steam catalytic cracking effluent comprises olefins and the olefins comprise one or more of ethylene, propylene, butenes, or combinations of these.

17. The process of claim 1, comprising contacting the hydrocarbon feed with the steam in the presence of the cracking catalyst in a cracking reactor, where the cracking reactor comprises one or more fixed bed reactors, fluidized bed reactor, batch reactor, moving bed catalytic cracking reactor, fluidized catalytic cracking (FCC) reactor, or combinations of these.

18. The process of claim 1, comprising contacting the hydrocarbon feed with the steam in the presence of the cracking catalyst at a reaction temperature of from 500° C. to 800° C., a mass ratio of steam to hydrocarbons of from 0.2 to less than 1, a weight ratio of cracking catalyst to hydrocarbon from 3 to 40, or combinations of these.

19. The process of claim 1, comprising contacting the hydrocarbon feed with the steam in the presence of the cracking catalyst for a residence time of from 1 second to 60 seconds.

20. A process for upgrading a hydrocarbon feed, the process comprising: contacting the hydrocarbon feed with steam in the presence of a cracking catalyst at reaction conditions sufficient to cause at least a portion of hydrocarbons in the hydrocarbon feed to undergo one or more cracking reactions to produce a steam catalytic cracking effluent comprising light olefins, light aromatic compounds, or both, where:
the light olefins are selected from the group consisting of ethylene, propylene, butenes, and combinations thereof,
the light aromatic compounds are selected from the group consisting of benzene, toluene, ethylbenzene, xylenes, and combinations thereof,
the cracking catalyst consists essentially of a hierarchical mesoporous ZSM-5 zeolite; and
the hydrocarbon feed comprises a whole crude oil having an API gravity between 25 and 50.

* * * * *